United States Patent [19]

Nelson

[11] 3,829,040

[45] Aug. 13, 1974

[54] COLLAPSING PIN ROLLER FOR TAPE CASSETTE

[75] Inventor: Norman E. Nelson, Roseville, Minn.

[73] Assignee: Minnesota Mining and Manufacturing Company, St. Paul, Minn.

[22] Filed: June 25, 1973

[21] Appl. No.: 373,034

[52] U.S. Cl. .................................... 242/199, 352/72

[51] Int. Cl.... G03b 1/04, G11b 15/32, G11b 23/04

[58] Field of Search ............................ 242/197–200, 242/76; 274/4 B, 4 C, 11 B, 11 C; 352/72–78; 226/196; 179/100.2 Z

[56] References Cited

UNITED STATES PATENTS 3,642,229 2/1972 Downey et al. .................... 242/199

3,710,039 1/1973 McFadden .................. 179/100.2 Z

*Primary Examiner*—Leonard D. Christian

*Attorney, Agent, or Firm*—Alexander, Sell, Steldt & DeLaHunt

[57] ABSTRACT

A rotatable tape guide roller for a recording tape cartridge is formed with a cylindrical exterior surface and a central bore into which one end of a spindle is inserted to mate therewith in an interference fit. The other end of the spindle protrudes into a bearing formed in a sidewall of the cartridge to aid in rotatably securing the roller therein, and the insertion of the spindle in the bore may be adjusted to vary the end play of the spindle in the bearing to provide an optimum dimensional roller tolerance.

7 Claims, 3 Drawing Figures

COLLAPSING PIN ROLLER FOR TAPE CASSETTE

BACKGROUND OF THE INVENTION

1. Field of the Invention

The present invention relates in general to magnetic recording tape cartridges and more specifically to a rotatable tape guide roller for such cartridges.

2. Description of the Prior Art

Typical tape cartridges include a case with spaced apart sidewalls, at least one tape supporting spool rotatably disposed between the case sidewalls, and a pair of tape guiding members, at least one of which may be a roller and either be fixed or rotatably pin mounted in the case. Rotatable tape guide rollers in tape cartridges are advantageous because they produce minimal drag on the tape and thereby reduce the torque required to advance the tape. However, in the past it has been a problem to efficiently and economically produce rotatable rollers of proper dimensions. If too small a bearing clearance, the rollers will bind in the case; if too large a clearance, they will oscillate on their pin shafts and when driven at high speeds produce an irritating noise. A lowering of the quality of the reproduction of the recorded format on the tape they guide as a result of such oscillation can also occur.

It is known to use small coil springs in conjunction with rotatable rollers to exert a biasing force on the rollers and thereby limit the oscillation of the rollers on their pin shafts. A second known method of preventing roller oscillation is to use machined rollers produced with extremely high dimensional precision. Although the employment of either biasing springs or carefully machined rollers has proved to be operationally satisfactory, both of these methods for eliminating roller oscillation require undesirable expense in manufacturing and assembling costs.

SUMMARY OF THE INVENTION

The present invention provides a magnetic tape cartridge having a rotatable tape guide roller that includes a cylindrical exterior surface and a central bore in which one end of a spindle is partially inserted. The spindle has an interference fit in the bore and is adapted to be translated therein to provide a roller with optimum dimensional tolerance in order to precisely limit end play of the spindle and, thus, minimize roller oscillation.

Another feature of the present invention is that the roller is formed with an outer cylindrical rim connected to the hub by a web so that the sidewall of the hub is relatively thin. As a result, the size of the bore is more readily increased upon insertion of the spindle therein than it would be if the body of the roller was entirely solid.

Yet another feature of the present invention is that the exterior surface of the cylindrical rim has a convex configuration that furnishes substantially identical contact with the tape whether or not the roller is tilted on its axis.

In a preferred embodiment, the roller spindle protrudes from one opening of the central bore and fits into a bearing formed in a sidewall of a tape cassette. Protruding from the other sidewall of the cassette is an axle pin that is formed integral therewith and fits into the opposite opening of the bore, and together the spindle and axle pin serve as a rotatable support for the roller.

The foregoing and other advantages of the present invention will appear from the following description. In the description reference is made to the accompanying drawings, which form a part hereof, and in which there is shown by way of illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENT

Figure 1:
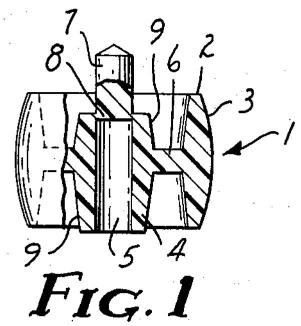
FIG. 1 is an enlarged side view partially in section of a tape guide roller that represents a preferred embodiment of the present invention.

Referring now to the drawings and specifically to FIG. 1, there is shown a rotatable tape guide roller 1 that represents a preferred embodiment of the present invention. The roller 1 has a rim 2, with a cylindrically shaped exterior surface 3, a hub 4 with a central bore 5, an annular web 6 that joins the rim 2 and hub 4 together, and a spindle 7, all of which are coaxial. The cylindrical exterior surface 3 of the rim 2 is preferably convex shaped for a purpose to be described, and its inner interior surface is bisected by the web 6. The hub 4 is offset with respect to the web 6 so that its bottom end, as shown in FIG. 1 extends below the lower end of the rim 2, whereas the top end of the hub 4 terminates below the upper end of the rim 2.

The roller 1 is molded from an acetal copolymer, but may be molded from a wide variety of metals or other plastic compounds. The spindle 7 is preferably molded integral with the hub 4 and a membrane 8 connects therebetween. The membrane 8 holds the spindle 7, as shown in FIG. 1, in axial alignment with the bore 5 such that it can be driven therein.

The spindle 7 is preferably formed to be approximately 2–3 mils thicker than the size of the bore 5, and to drive the spindle 7 into the bore 5 requires a sufficient force to sever the membrane 8 and overcome the interference created by the difference in the sizes of the spindle 7 and bore 5. Accordingly, as the spindle 7 enters the bore 5 the size of the bore 5 expands and the spindle 7 is compressed. The amount of compression of the spindle 7 and expansion of the bore 5 that actually occurs is dependent on the tensile strength of the hub 4 and the compressive strength of the spindle 7. As a result of the web connection between the hub 4 and the rim 2, the hub 4 has a relatively thin sidewall 9 that facilitates expansion of the bore 5 as the spindle 7 is driven therein. Subsequent to molding of the roller 1 but prior to positioning the roller 1 into a tape cartridge, the spindle 7 is initially driven into the bore 5 a short distance to sever the membrane 8. This insertion is subsequently increased corresponding to the size of the cartridge in which the roller 1 is inserted as will be described below.

Figure 2:
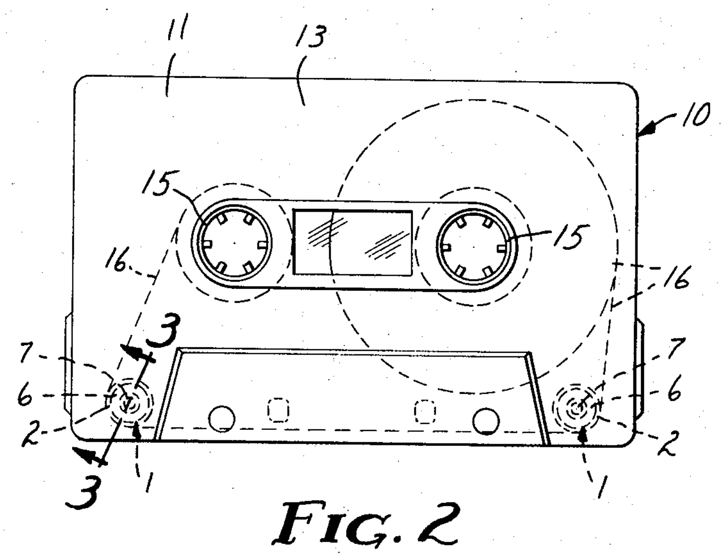
FIG. 2 is a plan view of a typical tape cassette with a pair of guide rollers of FIG. 1 and the internal components of the cassette indicated in dotted lines.
Figure 3:
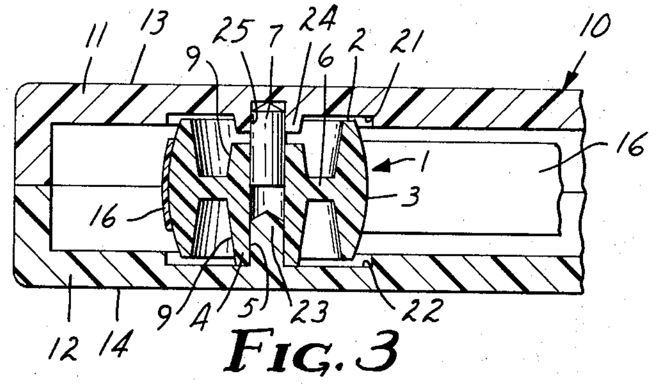
FIG. 3 is an enlarged view in cross section taken through the plane 3—3 of FIG. 2 and indicating the disposition of one of the guide rollers of FIG. 2 in the cassette.

Referring now to FIGS. 2 and 3, the disposition of two of the rollers 1 in a tape recording cassette is illustrated. However, it is not essential that the present invention be employed solely in such a cassette. Rather, the present invention is adapted for use with various types of tape cartridges requiring tape guide or drive rollers. The cassette of FIGS. 2 and 3 has a rectangular, hollow plastic case 10 formed from a pair of casing members 11 and 12 that are held together by ultrasonic welding, screws or other suitable fastening methods. The casing members 11 and 12 each include a substantially planar sidewall 13 and 14 respectively and are sufficiently spaced apart from one another to accommodate a pair of disk like spools 15 around which a tape 16 is wound. During operation of the cassette on a tape transport, the tape 16 travels between the spools 15 and is guided in such travel by the two rollers 1, which are disposed near one end of the case 10.

The two rollers 1 are each mounted in an identical manner in the case 10, and for purposes of clarity and brevity the mounting of only one of the rollers will be described with reference to FIG. 3. The roller 1 of FIG. 3 is interposed between the sidewalls 13 and 14 of the case. Formed in the inner surface of each of these sidewalls 13 and 14 is an annular recess 21 and 22 respectively into which the ends of the roller rim 2 protrude to provide a tape guiding surface that bridges across the space between the sidewalls 13 and 14. The lower end of the hub 4 also protrudes into the recess 22 of the sidewall 14, and an axle pin 23 that is circumscribed by the recess 22 loosely fits into the bore 5, which bore 5 cooperates with the axle pin 23 to serve as journaling means for rotatably connecting the roller 1 with the sidewall 14. It is not essential to the present invention that the pin 23 be integral with the sidewall 14. Instead the pin 23 can protrude from the hub 4 into a bearing formed in that sidewall.

The recess 21 circumscribes a raised area 24 through which a bearing 25 is formed. The protruding end of the roller spindle 7 is positioned in the bearing 25 in order that the spindle end and the bearing cooperate to serve as journaling means for rotatably connecting the roller 1 with the sidewall 13. Together the spindle 7 and the axle pin 23 provide an adjustable roller support that permits rotation of the roller 1 in the case 10. By accurately controlling the amount of insertion of the spindle 7 into the bore 5 to correlate to the size of the case 10, the widest span of the roller 1 (the distance from the lower end of the hub 4 to the outermost end of the spindle 7) is such that optimum end play of the spindle 7 in the bearing 25 is achieved. This controlled insertion of the spindle 7 is achieved during assembly of the case 10 in the following manner.

As previously described, prior to the assembly of the case 10 the spindle 7 of the roller 1 is partially driven a short distance into the bore 5. However, the spindle 7 still sufficiently protrudes from the hub 4 that when the roller 1 is initially positioned in the case 10 the spindle 7 bears against the sidewall bearing 25 to prevent the peripheries of the cartridge casing members 11 and 12 from abutting against one another. Accordingly, the casing members 11 and 12 must be pressed together with enough force to drive the spindle 7 further into the bore 5. In this way, as the casing members 11 and 12 are drawn towards each other until they abut, the widest span of the roller 1 is adjusted to equal the distance from the bottom of the recess 22 to the top of the bearing 25, which means that the spindle 7 has substantially no end play in the bearing 25.

Although this lack of end play prevents the roller 1 from axially oscillating up and down during rotation, it is desirable that the spindle 7 has a small amount of end play in order that the roller 1 will not bind in the case 10. Such end play can be accurately produced by subjecting the sidewalls 13 and 14 to a clamping pressure that momentarily deflects the sidewalls 13 and 14 inward towards one another and translates the spindle 7 further into the bore 5. Upon release of this clamping pressure, the sidewalls 13 and 14 are sufficiently resilient that they substantially return to their original unclamped configuration and the spindle 7 thereafter has an end play equal to the previous deflection of the sidewalls 13 and 14.

Accordingly, the insertion of the spindle 7 in the bore 5 is precisely regulated in order that the present invention provides a rotatable tape guide roller with optimum dimensional roller tolerance to minimize roller oscillation. Due to the correlation between the insertion of the spindle 7 and the size of the case within which the roller 1 is employed, a particular sized roller 1 can be utilized in various sized cartridges, thus, eliminating the necessity for a differently sized roller for each size of tape cartridge.

In addition to minimizing roller oscillation, the configuration of the present invention provides another important advantage as a result of the convex exterior surface 3 of the rim 2. It is this surface that comes in guiding contact with the tape 16 and its convex configuration assures substantial surface contact between the tape 16 and the roller 1 although the axis of the roller 1 may be tilted. Accordingly, the roller guiding pressure on the tape 16 is evenly distributed over the width of the tape whether or not the axis of the roller 1 is tilted. This is in contrast to rollers having straight exterior surfaces that apply an uneven pressure to the tape 16 if their axes are tilted.

What I claim is:

1. In a tape cartridge, the combination comprising:
a case with resilient, spaced apart sidewalls;
a bearing at an inner surface of one of said sidewalls;
a first journaling means associated with the inner surface of the opposed sidewall;
at least one rotatable tape guide roller having:
  an exterior cylindrical surface;
  a bore;
  a second journaling means for cooperating with said first journaling means to rotatably connect said roller to said opposed sidewall; and
  a spindle partially inserted into an end of the bore in an interference fit and protruding therefrom for cooperating with said bearing to rotatably connect said roller to said one of said sidewalls;
which cylindrical surface, spindle, bearing and first and second journaling means are all coaxial; and
said spindle contacting said one of said sidewalls of said case when the cartridge is initially assembled, and being adapted for further insertion into said bore by the application of pressure on said sidewalls to provide optimum end play for the spindle.

2. In a tape cartridge as recited in claim 1 wherein said first journaling means is in the form of an axle pin protruding from the inner surface of the other of said sidewalls and said second journaling means is comprised of an opposite end of the bore into which the axle pin loosely fits.

3. In a tape cartridge as recited in claim 1 wherein said roller is further comprised of a hub in which the bore is formed and a rim that includes said cylindrical surface, which hub and rim are joined by an annular web.

4. In a tape cartridge as recited in claim 3 wherein said cylindrical surface of said rim is convex shaped to assure substantial surface contact between the roller and tape that is advanced therearound.

5. In a tape cartridge as recited in claim 3 wherein said hub has a thin sidewall that facilitates expansion of said bore as said spindle is inserted therein.

6. In a tape cartridge, the combination comprising:
a case with resilient, spaced apart sidewalls;
a bearing formed in an inner surface of one of said sidewalls;
a first journaling means associated with the inner surface of the opposed sidewall;
at least one tape guide roller about which tape can be advanced and including:
a rim with an exterior cylindrical surface;
a hub in which a bore is formed coaxially with said cylindrical surface;
an annular web joining said rim and said hub together;
a spindle having one end inserted into said bore to mate therewith in an interference fit and the opposed end that protrudes therefrom to fit into said bearing; and
a second journaling means that is coaxial with said spindle for cooperating with said first journaling means to rotatably connect said roller to the opposed sidewall and serving together with said spindle and bearing as rotatable supports for the roller; and
said spindle bears against said one of said sidewalls when the cartridge is initially assembled, and is adapted for further insertion into said bore by the application of a clamping pressure on said sidewalls to provide optimum end play for the spindle.

7. In a tape cartridge, the combination comprising:
a case with resilient, spaced apart sidewalls;
a first journaling means associated with one of said sidewalls;
a second journaling means associated with the opposed sidewall;
at least one tape guide roller about which tape can be advanced and including:
an exterior cylindrical surface;
a hub in which a bore is formed coaxially with said cylindrical surface;
a spindle having one end inserted into said bore to mate therewith in an interference fit; and
a third journalling means that forms a portion of said spindle and protrudes from said bore for cooperating with said first journaling means to rotatably connect said roller to said one of said sidewalls; a fourth journaling means for cooperating with said second journaling means to rotatably connect said roller to said opposed sidewall; and
said third journaling means bearing against said one of said sidewalls when the cartridge is initially assembled, and said third means is adapted to produce further insertion of the spindle into said bore by the application of a clamping pressure on said sidewalls to provide an optimum dimensional roller tolerance.

* * * * *